United States Patent Office 2,839,474
Patented June 17, 1958

2,839,474
CATALYSTS AND CATALYTIC PROCESSES

Carl E. Johnson, Griffith, and Wilford J. Zimmerschied, Crown Point, Ind., assignors to Standard Oil Company, Chicago, Ill., a corporation of Indiana No Drawing. Application August 21, 1953
Serial No. 375,808

7 Claims. (Cl. 252—428)

The present invention relates to novel catalysts, to processes for their manufacture and to their utilization, particularly in processes for the conversion of hydrocarbons.

One object of our invention is to provide new solid catalysts derived from the interaction of certain halides of titanium and certain esters of phosphorus acids. Another object is to provide new processes for the manufacture of said solid catalysts. Yet another object of our invention is to provide new and advantageous catalysts for the various processes in which acid-type catalysts such as HF, $H_2SO_4$, liquid or "dry" acids of phosphorus and acidic silica-alumina compositions have heretofore been employed. These and other objects of our invention will become apparent from the ensuing description thereof.

In one aspect, our invention relates to a process for the manufacture of solid materials which are active in acid-type catalysts, e. g. conversions of normally gaseous olefins such as ethylene, propylene, butenes, or their mixtures. Briefly, such catalysts are prepared by heating a mixture of a halide of titanium selected from the group consisting of fluorides, chlorides and bromides with a lower alkyl ester of an acid of phosphorus selected from the group consisting of orthophosphoric acid and triphosphoric acid, said alkyl groups containing not more than 6 carbon atoms. The molar ratio of halogen, as halide, to the alkyl group in the reaction mixture may be varied within the range of about 0.3 to about 1. The reaction mixture is heated at a temperature sufficient to cause substantial evolution of alkyl halide from the reaction mixture, viz. temperatures between about 75° C. and about 300° C. The heating of the reaction mixture is continued until at least about 90% removal of halogen from the reaction mixture is effected. It is desirable, in order to insure substantially complete evolution of the halogen content of the reaction mixture, to terminate the process of catalyst manufacture by conducting at least one of the heating stages at a temperature between about 175° C. and about 300° C., preferably between about 200° C. and about 250° C. The solid catalysts prepared in the manner described above are active for acid-catalyzed reactions of organic compounds.

Before employment in catalytic conversion, the catalysts of the present invention may be stripped with hot gases to ensure the removal of residual halogen content and/or of carbonaceous residues which may be contained in the catalyst as prepared. For the purpose of stripping the residual halogen content of the catalyst, an inert gas such as nitrogen, helium, $CO_2$, methane or the like, may be employed at temperatures between about 250° C. and about 350° C. Before employment, the catalysts may be subjected to various treatments such as a treatment with hydrogen at temperatures between about 350° C. and about 500° C. under a hydrogen pressure of at least about 500 p. s. i., for example, 500 to 2000 p. s. i., for a period of about ½ to 24 hours. Alternatively, the catalysts may be pretreated with oxygen-containing gases such as air or flue gases at temperatures between about 400° C. and about 500° C. and atmospheric pressure for about ½ to about 10 hours.

The preferred halide of titanium employed in our process is titanium tetrachloride. We may, however, employ other halides of titanium for the purposes of preparing acid-active catalysts, for example $TiCl_3$, $TiCl_2$, $TiF_3$, $TiF_4$, $TiBr_2$, and $TiBr_4$.

The alkyl groups of the esters may be ethyl, methyl, n-propyl, isopropyl, n-butyl, isobutyl, n-amyl, isoamyl, n-hexyl and the like. Various t-alkyl phosphates may also be employed, but because they are somewhat more difficult to prepare than the corresponding n-alkyl and isoalkyl phosphates, their use in the present invention is not preferred. In general, we prefer to employ the fully esterified phosphorus acids, but active catalysts can also be prepared from acid-esters of the phosphorus acids, for example, diethyl ortho-phosphate.

Our new catalysts may be promoted, if desired, by addition thereto of a small proportion (for example, 0.1 to 5 percent by weight) of a hydrogen halide such as hydrogen chloride or hydrogen bromide, or of a Friedel-Crafts halide, such as aluminum chloride or $TiCl_4$, before or during use in catalytic reactions.

Our new catalyst compositions need no supporting material but can be composited, if desired, with porous or non-porous supports such as kieselguhr, alumina, titania, zirconia, clays, charcoal, silica gel, silica beads, glass beads, or the like, and may advantageously be formed into pellets therewith.

The catalyst is conveniently employed as a powder, slurried in the charging stock, or as solid particles, pellets, or pills, in a fixed or moving bed. Numerous alternative processes and reactor designs will be apparent to those skilled in the art.

The following specific examples are intended to be merely illustrative and not to limit the broad scope of our invention.

*Example 1*

Tri-n-butyl orthophosphate in the amount of 200 grams and 78 grams of $TiCl_4$ (corresponding to 0.73 chlorine atom per butyl group) were stirred with heating, resulting in the evolution from the reaction mixture of n-butyl chloride, which was removed by distillation as it was formed. Over a reaction period of 8 hours, the temperature of the mixture was gradually raised from 20° C. to 232° C. The reaction product was a black, porous mass. Into a 500 ml. shaker bomb were placed 10 grams of the catalyst and 94 grams of propylene. The bomb was then heated to a maximum temperature of 212° C. The pressure rose to a maximum of 1450 p. s. i. g. at 185° C. and then dropped. The total heating time was 6 hours. This reaction yielded 73 grams of liquid propylene polymer, R. I. (20° C.) 1.4375, corresponding to a conversion of about 78%, based on propylene charged.

*Example 2*

Titanium tetrachloride was added dropwise to ethyl orthophosphate maintained at 100° C. over the period of 1 hour, resulting in the liberation of ethyl chloride, which was collected in a Dry Ice-acetone trap. In all, 0.66 mol of $TiCl_4$ was used with 1 mol of the ethyl orthophosphate, corresponding to 0.88 chlorine atom per ethyl group. A fluffy solid material began to form in the reaction mixture after three-fourths of the $TiCl_4$ was added. The reaction mixture was then heated to 200°

C., whereupon further quantities of ethyl chloride were evolved, and was maintained at that temperature for 4 hours, at which time there was no further ethyl chloride evolution. The reaction yielded 72 grams of a brown-gray, friable solid catalyst. The amount of ethyl chloride collected amounted to 60 cc. Into a shaker bomb were placed 10 grams of the catalyst and 109 grams of propylene and the mixture was heated to 218° C. for 9 hours. The polymerization reaction yielded a liquid propylene polymer in the proportion of 54 weight percent, based on propylene charged. The refractive index of the polymer was 1.4380 at 20° C.

Example 3

The catalyst preparation procedure of Example 2 was repeated but the mol ratio of $TiCl_4$ to ethyl orthophosphate was 0.44/1. The amount of ethyl chloride evolved in the reaction was 94% of theoretical and 71.1 grams of catalyst were produced. Into a shaker bomb were placed 10 grams of the catalyst and 104 grams of propylene and the mixture was heated at 218° C. for 6 hours to yield a liquid propylene polymer having a refractive index of 1.4290 at 20° C.; the polymer yield was 51.3 weight percent, based on propylene charged.

Example 4

The procedure of Example 2 is repeated but molten $TiBr_4$ is substituted for the $TiCl_4$ of Example 3.

Example 5

Thiophene was propylated using the catalyst of Example 2. A 250 ml. stirred autoclave was charged with 5 g. of the catalyst and 27 g. of propylene and heated with stirring to 540° F. for 3 hours. The reaction products were filtered from the catalyst and distilled to yield 30.6 g. of an isopropylthiophene ($n_D^{20}$ 1.5036) and 8.8 g. of diisopropylthiophene ($n_D^{20}$ 1.4990). The data show that 54% of the propylene was consumed in alkylation.

The examination of solid catalysts prepared from $TiCl_4$ and orthophosphate esters by X-rays showed them to be amorphous materials.

The present catalysts may contain, as promoter, between about 0.5 and about 20 weight percent, based on the total weight of catalyst, of an oxide of a metal selected from subgroups 5 or 6 of the periodic table, viz. oxides of V, Nb, Ta, Cr, Mo or W. The promoting metal oxide may be incorporated into the product produced by the interaction of the titanium halide and ester of a phosphoric acid or, preferably, may be incorporated in the reaction mixture which is employed to produce the catalyst. The inclusion of metal oxides in the titanium-phosphorus catalysts tends to increase their efficacy in hydrogenation and dehydrogenation reactions. Thus the metal oxide-containing Ti–P catalyst may be employed with hydrogen pressures between about 200 and about 1000 or 1500 p. s. i. at temperatures between about 200° C. and about 500° C. for the hydrodesulfurization of sulfur-containing petroleum fractions such as naphthas or gas oils at liquid hourly space velocities between about 0.5 and about 4.

Our new catalysts are useful in a wide variety of hydrocarbon-conversion reactions, such as the polymerization of $C_3$ and higher olefins and of other unsaturated hydrocarbons at around 150 to 300° C. to form liquids or oils of higher molecular weight; the alkylation of aromatic hydrocarbons, phenols, heterocyclics or isoparaffins with olefins or olefin-affording substances or with diolefins; the isomerization of paraffins or naphthenes; the isomerization of alkylbenzenes such as xylenes, trimethylbenzenes, higher-alkyl xylenes, and the like; the desulfurization or hydrodesulfurization of petroleum fractions containing organic sulfur compounds, such as West Texas virgin heavy naphtha, coke still naphtha, and the like; the side-chain dehydrogenation of alkyl aromatics such as isopropylbenzene, and the like; the treatment of motor fuels to increase their antiknock rating; cracking of petroleum fractions, and the like.

The catalysts produced by the present invention may also be employed for the interaction of olefins with hydrogen sulfide to produce mercaptans; the interaction of olefins, carbon monoxide and steam to produce carboxylic acids; isomerization of olefins, e. g. 1-butene to 2-butene; the polymerization of olefin oxides; the interaction of alcohols or mercaptans with olefin oxides to produce alkoxy derivatives thereof; the dehydration of alcohols to produce olefins and ethers; the dehydration of 1,3-butylene glycol to produce butadiene; the reactions of olefins with carboxylic acids to form esters, etc.

It frequently happens that in the course of various conversions carried out in the presence of our catalysts, particularly in conversions of hydrocarbons such as the polymerization of olefins at high temperatures, hydrogen-deficient carbonaceous or coke-like residues accumulate upon the catalyst and reduce its catalytic efficiency. The present catalysts may readily be regenerated by treatment with hydrogen or oxygen as above described. As a preliminary to the regeneration of partially spent catalyst with hydrogen or oxygen, it may be desirable to extract the catalyst with a hydrocarbon solvent such as benzene, pentane, hexane, etc., usually at temperatures between about 50 to about 200° C. under pressure sufficient to maintain the extractant in the liquid phase in order to remove extractable hydrocarbon residues from the catalyst, thereby facilitating the subsequent regeneration treatment with hydrogen or oxygen.

A catalyst was prepared by the addition of 18 g. of $TiCl_4$ to 31 g. of triisopropyl phosphite. A vigorous reaction occurred even at room temperature. The mixture was heated to 200° C. for 4 hours. The solid material resulting from this reaction was shown to have catalytic properties. Thus, a stirring autoclave was charged with 5 g. of the catalyst and 60 g. of propylene and heated with stirring at 200° C. for 3 hours to yield a liquid propylene polymer. It will be apparent that other trialkyl phosphites may be reacted with titanium fluorides, chlorides or bromides to yield solid materials which are capable of functioning as acid-type catalysts.

Having thus described our invention, what we claim is:

1. The process of preparing a solid material which is catalytically active for the polymerization of propylene, which process comprises heating a halide of titanium selected from the group consisting of titanium fluorides, chlorides and bromides with a lower alkyl ester containing not more than 6 carbon atoms per alkyl group of an acid selected from the group consisting of orthophosphoric and triphosphoric acids, the molar ratio of halogen as halide in said reaction mixture to alkyl groups being between about 0.3 and about 1, said heating being conducted at a temperature sufficient to effect substantial evolution of alkyl halide from said reaction mixture, continuing said heating until said reaction mixture is substantially free of halogen, and recovering a solid catalytic material thus produced.

2. The process of preparing a solid material which is catalytically active for the polymerization of propylene, which process comprises heating titanium tetrachloride with an alkyl orthophosphate containing not more than 6 carbon atoms per alkyl group, the molar ratio of chloride to alkyl groups in said reaction mixture being between about 0.3 and about 1, conducting said heating at a temperature sufficient to effect substantial evolution of alkyl chloride from the reaction mixture, continuing said heating until said reaction mixture is substantially free of chlorine, and recovering a solid catalyst thus produced.

3. The process of claim 2 wherein the maximum temperature attained in the reaction mixture lies between about 175° C. and about 300° C.

4. The process of claim 3 wherein said alkyl chloride is removed at substantially the rate at which it is evolved from said reaction mixture.

5. The process of claim 3 wherein said alkyl orthophosphate is an n-alkyl orthophosphate.

6. The process of claim 5 wherein said alkyl orthophosphate is ethyl orthophosphate.

7. The process of claim 5 wherein said alkyl orthophosphate is n-butyl orthophosphate.

References Cited in the file of this patent

UNITED STATES PATENTS

| | | |
|---|---|---|
| 2,181,640 | Deanesly et al. | Nov. 28, 1939 |
| 2,358,011 | Ipatieff et al. | Sept. 12, 1944 |
| 2,429,575 | Appleby et al. | Oct. 21, 1947 |
| 2,570,542 | Gerald et al. | Oct. 9, 1951 |
| 2,614,136 | Kolfenbach et al. | Oct. 4, 1952 |
| 2,727,010 | Zimmerschied | Dec. 13, 1955 |